UNITED STATES PATENT OFFICE.

EUGENE M. TOTTEN, OF BUFFALO, NEW YORK, ASSIGNOR OF ONE-HALF TO ARTHUR M. WHALEY, OF SAME PLACE.

SOLDERING COMPOUND.

SPECIFICATION forming part of Letters Patent No. 667,999, dated February 12, 1901.

Application filed May 23, 1900. Serial No. 17,748. (No specimens.)

*To all whom it may concern:*

Be it known that I, EUGENE M. TOTTEN, of Buffalo, in the county of Erie and State of New York, have invented certain new and useful Improvements in Soldering Compounds; and I do hereby declare the following to be a full, clear, and exact description of the invention, such as will enable others skilled in the art to which it appertains to make and use the same.

This invention contemplates the production of a new and highly efficient composition of matter for soldering aluminium.

Heretofore it has been generally necessary in soldering aluminium parts to first file or scrape the parts, then place a flux on the scraped surface, and finally apply a soldering compound with the aid of a soldering-tool. This has been a source of no little annoyance, causing an expenditure of time and labor. The soldering of aluminium parts has also been effected by subjecting both the metal and solder to an extreme degree of heat and then treating the aluminium as in welding or brazing processes. Practice has demonstrated that because of the high heat conductivity of aluminium the heat is rapidly drawn away from the molten solder, preventing it from having sufficiently free flow.

The object of this invention is to produce a soldering compound capable of ready and immediate use, the agencies necessary for effecting a thorough union of parts being constituent elements of the article as made and sold in its commercial form. The filing or scraping of the parts is avoided and the employment of a flux separate from the soldering compound is rendered unnecessary.

It is well known in the art that the scraping of the aluminium surfaces is for the purpose of partially removing the surface oxids to permit the soldering compound to adhere, and also that it is the presence of these oxids that renders it difficult if not impossible to secure a firm joint or union between soldered parts.

The compound is composed of the following ingredients in the proportion specified: aluminium, twenty per cent.; tin, thirty-eight per cent.; zinc, forty per cent., and a hydrocarbon two per cent.

In the manufacture of the solder aluminium and tin are first melted, then the zinc is added, and after the reduction of the metals while still in a molten state and without additional heating there is added two per cent. hydrocarbon, which is mixed with the other ingredients into a homogeneous mass. This latter ingredient may be fat, wax, paraffin, or any other species of hydrocarbon, the invention not being limited in this respect. It has been demonstrated that the addition of the hydrocarbon to the alloy by increasing the amount of carbon therein reduces and removes the oxids, which would otherwise form on the melted metal, and in consequence the compound when cool is white and free from oxids when solid. It is the carbon alone which effects the reduction of the metallic oxids formed on the surface of the aluminium parts to be soldered, and the scraping of such parts is rendered unnecessary because of the nonpresence of oxids in the soldering compound made as hereinbefore specified.

In the use of my soldering compound no mechanical device or treatment is necessary to prepare the aluminium or the solder, the soldering of aluminium parts being accomplished in the same way as in ordinary tin or other metal soldering by means of a soldering copper or bit, the solder compound being in solidified stick form. No flux separate from that contained in the commercial form of the compound is required in the application of the solder. Practice has demonstrated that aluminium parts treated with this compound have greater tensile strength at their union than at any other point and that the integrity of the joint is not impaired by time and exposure.

It will be understood that the proportion hereinbefore specified may be varied without departing from my invention. In some instances, as in soldering jewelry, it might be desirable to have a softer solder. This may be effected by lessening the relative proportion of aluminium.

I claim as my invention—

As an article of manufacture, a soldering compound, consisting, in its entirety, of aluminium, tin, zinc, and a hydrocarbon, in about the proportions specified, all thoroughly mixed together while melted, thereby forming a homogeneous mass.

In testimony whereof I have signed this specification in the presence of two subscribing witnesses.

EUGENE M. TOTTEN.

Witnesses:
J. NOTA MCGILL,
F. S. MAGUIRE.